United States Patent [19]

Shimizu

[11] Patent Number: 5,345,657
[45] Date of Patent: Sep. 13, 1994

[54] CORD STOPPER

[75] Inventor: Hideki Shimizu, Toyonaka, Japan

[73] Assignee: Yoshida Kogyo K.K., Tokyo, Japan

[21] Appl. No.: 107,280

[22] Filed: Aug. 16, 1993

[30] Foreign Application Priority Data

Aug. 12, 1992 [JP] Japan .................................. 4-062313

[51] Int. Cl.⁵ .................................................. F16G 11/00
[52] U.S. Cl. .................................. 24/115 G; 24/136 L
[58] Field of Search ............ 24/115 G, 115 M, 115 F, 24/136 A, 136 L; 403/146

[56] References Cited

U.S. PATENT DOCUMENTS

| | | | |
|---|---|---|---|
| 4,188,686 | 2/1980 | Baum | 24/115 G |
| 4,288,891 | 9/1981 | Boden | 24/115 G |
| 4,453,292 | 6/1984 | Bakker | 24/115 G |
| 4,724,584 | 2/1988 | Kasai | 24/115 G |
| 4,811,466 | 3/1989 | Bubli | 24/115 G |
| 4,878,269 | 11/1989 | Anscher et al. | 24/115 G |
| 5,197,166 | 3/1993 | Meier et al. | 24/115 G |

Primary Examiner—Victor N. Sakran
Attorney, Agent, or Firm—Hill, Steadman & Simpson

[57] ABSTRACT

A cord stopper has a socket having a pair of opposed through holes formed through opposed sides thereof and a plug having a passage formed therethrough. The plug is reciprocally movable through the socket between a pulled-out position where the through holes and the passage are in alignment with each other and a depressed position where the cord is clamped between the edges of the through holes and the through aperture. The cord stopper further includes a device for locking the plug in its depressed position within the socket.

2 Claims, 4 Drawing Sheets

CORD STOPPER

BACKGROUND OF THE INVENTION

1. Field of the Invention

The present invention relates to a cord stopper for fastening and adjusting in length a cord used on clothes, baggages, etc.

2. Description of the Prior Art

A typical cord stopper of the type described is disclosed in Japanese Patent Laid-open Publication No. 59-78475. The disclosed cord stopper comprises a cylindrical socket having a blind bore, a plug fitted into the blind bore and a biasing means disposed between the bottom of the blind bore and the plug and adapted to urge the plug outward. The cylindrical socket has a pair of opposed through holes formed through its periphery normal to the longitudinal axis thereof. The plug has a through aperture formed normal to the longitudinal axis thereof. which hole is adapted for alignment with the through holes of the cylindrical socket when the plug is thrust into the socket. In use, the plug is thrust into the socket against the bias of the biasing means until the through aperture of the plug comes into alignment with the through openings of the socket. Then, a cord is threaded through the through holes and the through aperture of the socket and the plug, respectively. Subsequently, release of the force from the plug will cause the plug to tend to pop out of the socket under the bias of the biasing means, so that the cord is resiliently clamped between the edges of the through holes of the socket and the through aperture of the plug.

However, the conventional cord stopper suffers some drawbacks.

For one thing, the small biasing means capable of being housed in the cylindrical socket is limited in biasing power, so that the biasing means does not provide sufficient cord-retaining force.

Furthermore, threading of the cord through the cord stopper requires bringing the through holes of the socket and the through aperture of the plug into alignment with each other and then keeping them in alignment throughout the threading operation. This requires dexterity on the part of the user. The cord-threading operation is very difficult.

Still furthermore, the plug is partly projected beyond the socket under the bias of the biasing means, which renders the cord stopper as a whole to look unsightly. If the thinner cord is used, the more the plug projects beyond the socket and the more unsightly the cord stopper is.

SUMMARY OF THE INVENTION

With the foregoing difficulties in view, it is, therefore, an object of the present invention to provide a cord stopper which is easy to thread a cord therethrough, which is reliable to lock the cord and which is good in appearance.

According to the present invention, there is provided a cord stopper for fastening a cord thereto, the cord stopper comprising a socket having a pair of opposed through holes formed therethrough, a plug having a passage formed therethrough, the plug reciprocally movable within the socket between a pulled-out position where the through holes and the passage are in alignment with each other for threading of the cord therethrough and a depressed position where the cord is clamped between the edges of the through holes and the passage and means for locking the plug in the depressed position within the socket.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PRESENTLY PREFERRED EMBODIMENTS

Figure 1:
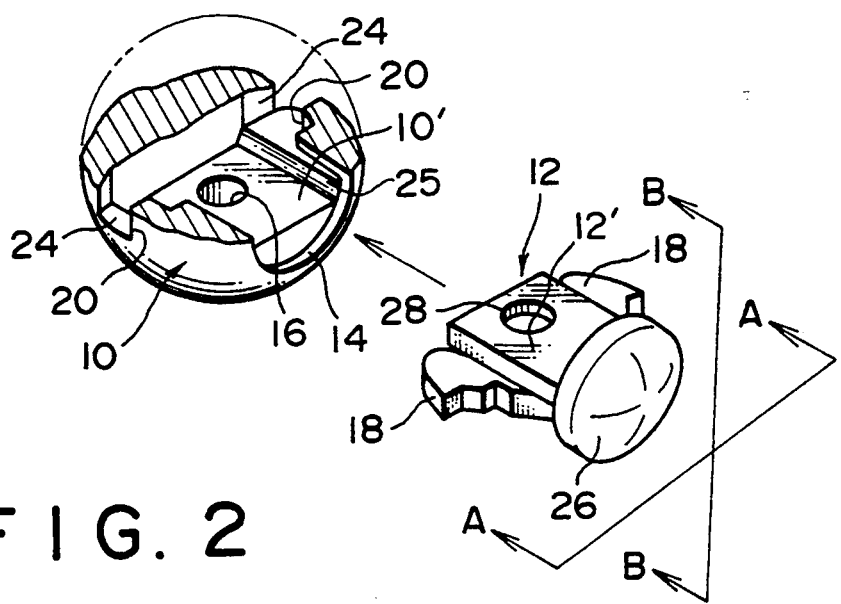
FIG. 1 is an exploded perspective view partly in cross-section of a cord stopper according to a first embodiment of the present invention.

Some preferred embodiments of the present invention will be described below in conjunction with the drawings appended hereto. FIGS. 1 through 5 show a cord stopper according to a first embodiment of the present invention. The cord stopper is made of plastics and broadly comprises a spherical socket 10 and a plug 12 reciprocally movable within the socket 10. The spherical socket 10 has a rectangular cavity 10' formed therein and a pair of opposed through holes 16 formed through respective opposed sides of the socket 10. The spherical socket 10 has a pair of opposed through openings 20 formed through the opposed sides thereof and disposed normal to the opposed through holes 16. Both holes and openings 16 and 20 communicate with the rectangular cavity 10'. A pair of opposed steps 22 are formed in the cavity 10' and disposed one immediately above each opening 20. The spherical socket 10 has a circular countersink 14 formed in the top of the rectangular cavity 10'. Two pairs of opposed guide walls 25 are formed on the inner sides of the rectangular cavity 10' and disposed one pair on the each side of the openings 20.

Figure 3:
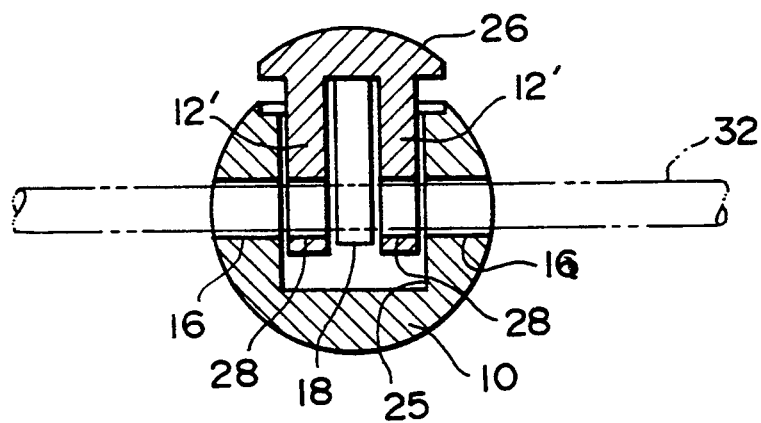
FIG. 3 is a cross-sectional view taken generally along the line B—B of FIG. 1, but showing a cord to be threaded through the cord stopper.

As shown in FIGS. 1 and 3, the plug 12 generally comprises a circular head 26, a pair of spaced parallel side studs 12'. 12' and a pair of resilient arms 18, 18 mounted beneath the lower surface of the head 26. The circular head 26 is capable of complementarily fitting into the circular countersink 14 of the spherical socket 10. Each of the resilient arms 18 has its proximal end disposed between the side studs 12' and its distal end 18' projecting sideways beyond the studs 12'. The side studs 12' have respective cord passages or circular through apertures 28 formed coaxially with each other.

Figure 2:
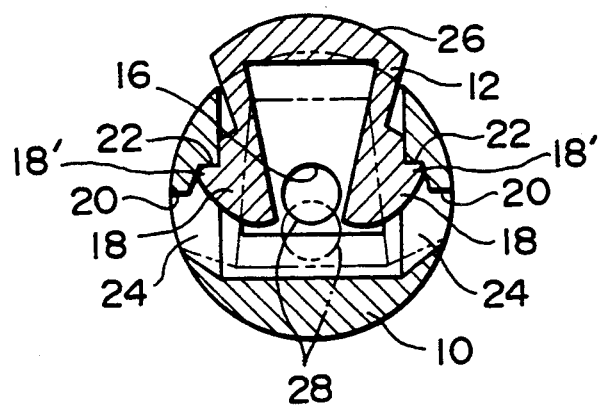
FIG 2 is a cross-sectional view taken generally along the line A—A of FIG. 1, but showing a plug to be inserted into a socket and to assume a pulled-out position.

In assembly, first, the plug 12 is inserted into the cavity 10' of the socket 10 as indicated by an arrow mark in FIG. 1, with the studs 12' guided along the opposed guide walls 25 and with the resilient arms 18 compressed by the opposed sides of the cavity 10' against their own resiliency. This plug 12 continues to thrust into the cavity 10' until the distal ends 18' of the resilient arms 18 come into snapping engagement with the steps 22, so that the cord stopper is assembled with the plug 12 and assumes a pulled-out position, as shown in FIG. 2. It is to be noted that, when the plug 12 assumes the pulled-out position, the through apertures 28 of the plug 12 come into alignment with the through holes 16 of the spherical socket 10. A cord 32 is threaded through the through holes 16 of the socket 10 and the through apertures 28 of the plug 12.

Figure 4:
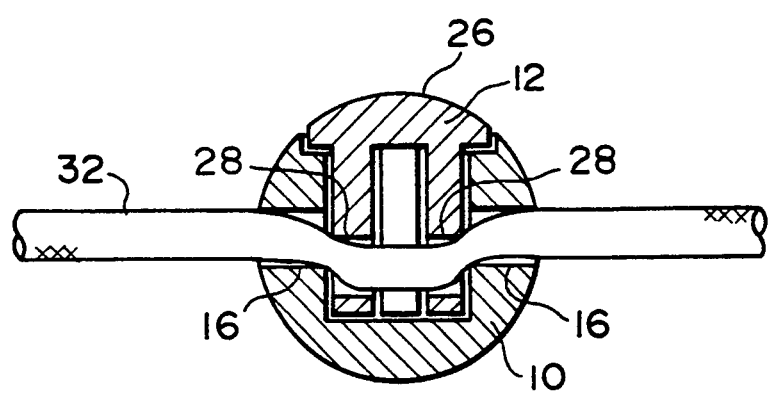
FIG. 4 is a view similar to FIG. 3, but showing the plug to assume a depressed position.
Figure 5:
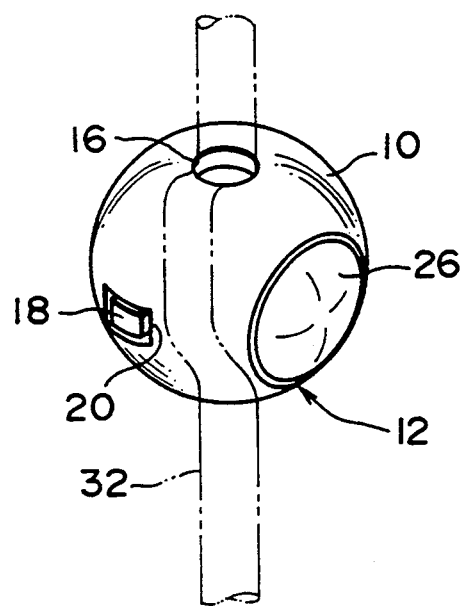
FIG. 5 is a perspective view of the cord stopper of FIG. 4.

For fastening the cord 32 to the cord stopper, as indicated by phantom lines in FIG. 2, the plug 12 is further depressed until the distal ends 18' of the resilient arms 18 come into locking engagement with the through openings 20. As shown in FIGS. 4 and 5, when the plug 12 assumes the depressed position, the cord 32 is firmly clamped between the edges of the through holes 16 and the through apertures 28. And, the circular head 26 of the plug 12 is fitted into the countersink 14 of the socket 10.

For releasing the cord 32 from the cord stopper or adjusting the length of the cord 32, the distal ends 18' of the resilient arms 18 exposed coplanar with the outer surface of the spherical socket 10 are pressed inward and toward the circular countersink 14 against the resiliency of the resilient arms 18 by a tip of a finger nail or the like and simultaneously the circular head 26 is pulled up until the distal ends 18' of the resilient arms 18 come out of engagement with the through openings 20 and move into engagement with the steps 22 of the spherical socket 10, so that the plug 12 restores into the pulled-out position, as shown in FIGS. 2 and 3. With the through apertures 28 of the plug 12 and the through holes 16 of the socket 10 aligned with each other, the cord 32 may be released such as for replacement or may be adjusted in length.

Turning now to a second embodiment shown in FIGS. 6 through 10, the cord stopper broadly comprises a hollow cylindrical socket 40 having a cylindrical cavity 40' formed longitudinally thereof and a cylindrical plug 42 mounted in the cylindrical cavity 40' for reciprocation along the cylindrical cavity 40'.

The hollow cylindrical socket 40 has two pairs of opposed upper and lower through holes 64, 62 formed diametrically through the periphery thereof with each pair spaced from the other pair longitudinally of the socket 40. The hollow cylindrical socket 40 has also a pair of opposed guide grooves 58 formed longitudinally in the inner periphery of the socket 40 and disposed in diametrically opposed relation to each other and in normal relation to the two pairs of opposed through holes 62, 64. Each of the guide grooves 58 terminates at its lower end in a circular through terminal opening 60.

The cylindrical plug 42 includes a cylindrical plug body 42' and a circular head 46 mounted integrally on the top of the cylindrical plug body 42'. The plug body 42' has a pair of upper and lower through apertures 68, 66 formed diametrically through the plug body 42' with one aperture 68, 66 spaced from the other 66, 68 longitudinally of the plug body 42'. The plug body 42' also has a through opening 48 formed diametrically through the plug body 42' and disposed in normal relation to the through apertures 68, 66. The cylindrical plug 42 further includes a locking means 50 mounted in the through opening 48 for locking the plug 12 in the depressed position within the socket 10, as closely described hereinbelow. The locking means 50 comprises a compression coil spring 50' and a pair of projecting lugs 56 one fastened to each end thereof.

Figure 7:
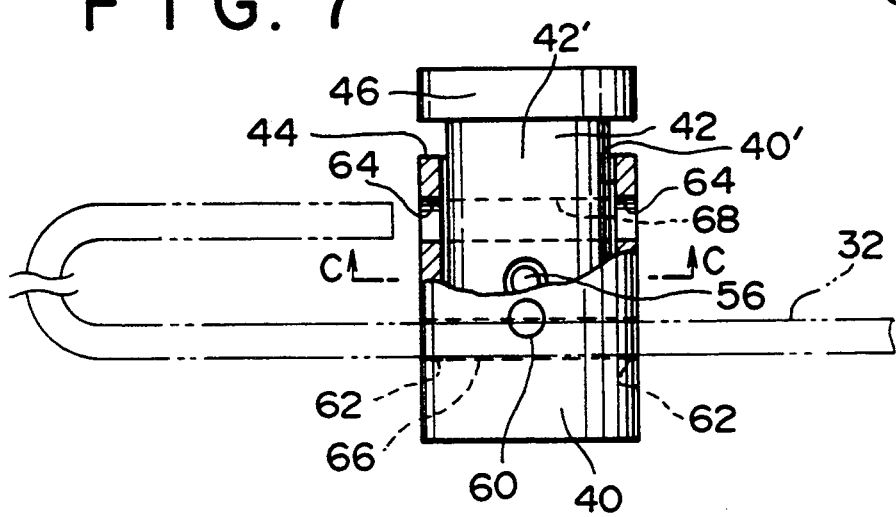
FIG. 7 is a front view partly in cross-section of the cord stopper of FIG. 6, but showing the plug to assume a pulled-out position.
Figure 8:
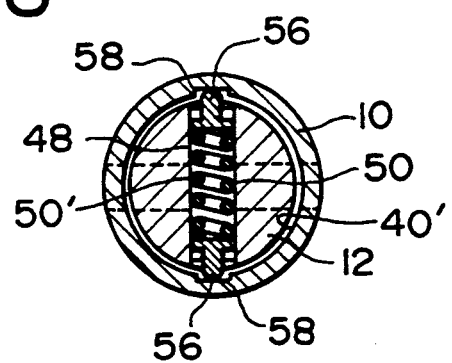
FIG. 8 is cross-sectional view taken generally along the line C—C of FIG. 7.

In assembly, first, the locking means 50 is fitted into the through opening 48 of the cylindrical plug 42. The plug 42 is then inserted into the cavity 40' of the hollow socket 40 with the projecting lugs 56 urged against the inner periphery of the socket 40 under the bias of the compression coil spring 50' until the opposed projecting lugs 56 reach the upper ends of the opposed guide grooves 58, whereupon the opposed projecting lugs 56 snaps into engagement with the upper end of the guide grooves 58, 58 under the resiliency of the compression coil spring 50' as shown in FIGS. 7 and 8. When the plug 42 assumes this pulled-out position within the socket 40, the through apertures 66, 68 of the plug 42 come in alignment with the through holes 62, 64, respectively, of the socket 40 as better shown in FIG. 7.

Figure 6:
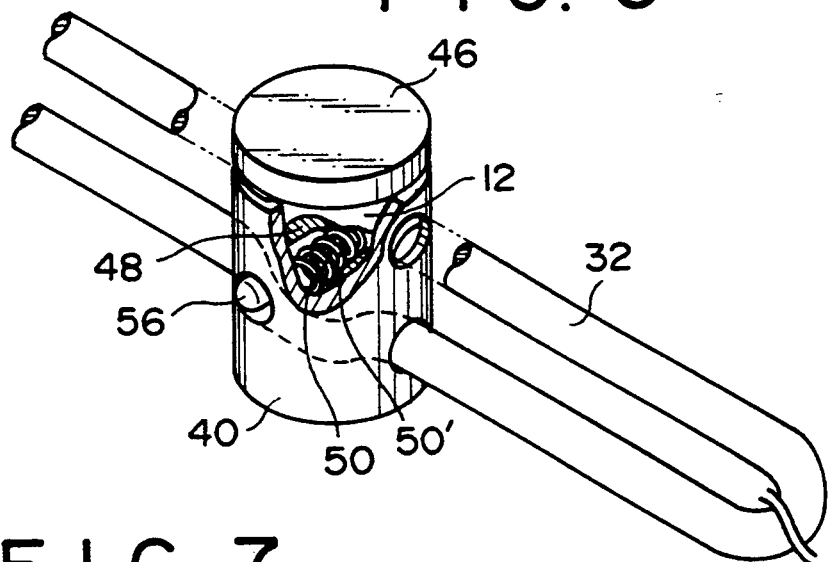
FIG. 6 is a perspective view partly in cross-section of a cord stopper according to a second embodiment of the present invention, showing a plug to assume a depressed position.
Figure 9:
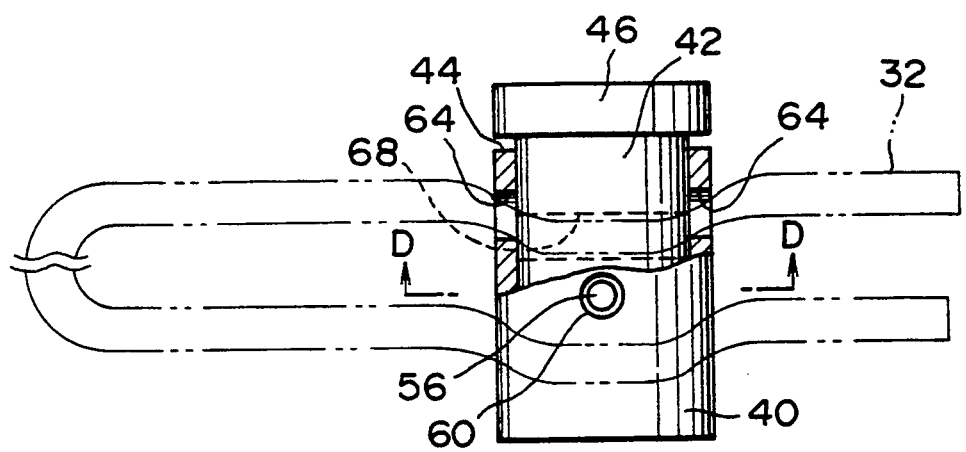
FIG. 9 is a view similar to FIG. 7 but showing the plug to assume a depressed position.
Figure 10:
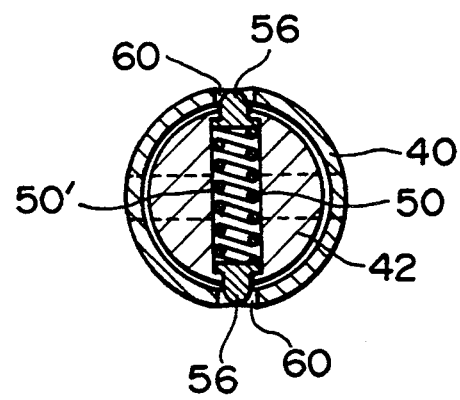
FIG. 10 is a cross-sectional view taken on the line D—D of FIG. 9.

For fastening the cord 32 to the cord stopper, as shown in FIG. 7, the cord 32 is first threaded through the through holes 64 and the through apertures 68 aligned with each other. The cord 32 is then turned back and threaded through the through holes 62 and the through apertures 66 also aligned each other. Continued depression of plug 42 within the socket 40 with the projecting lugs 56 guided along the longitudinal guide grooves 58 eventually causes the projecting lugs 56 to come into locking engagement with the respective terminal openings 60 under the resiliency of the compression spring 50', as shown in FIGS. 6, 9 and 10, whereupon the cord 32 is firmly clamped between the edges of the through holes 62, 64 and the through apertures 66, 68 which are unaligned with each other. When the plug 42 assumes this depressed position, the circular plug head 46 is close to coming into abutting engagement with the upper rim 44 of the cylindrical socket 40, as better shown in FIG. 9.

For releasing the cord 32 from the cord stopper or adjusting the length of the cord 32, any of the projecting lugs 56 exposed coplanar with the outer surface of the peripheral wall of the cylindrical socket 40 is pressed inward against the bias of the compression coil spring 50' by a finger nail, and simultaneously the circular head 46 is pulled up with the projecting lugs 56 guided along the guide grooves 58 until the projecting lugs 56 abut against the upper ends of the respective guide grooves 58, whereupon the plug 42 assumes a pull-out position, as shown in FIGS. 7 and 8. With the through apertures 66, 68 of the plug 42 and the through holes 62, 64 of the socket 40 aligned, the cord 32 may be released for replacement or may be adjusted in length.

It is to be acknowledged that, instead of a through aperture the passage 28 may be a vertical groove extending along a longitudinal axis of the plug.

With the construction set forth hereinabove, since the plug is tentatively positioned in the pull-out position in the socket with the through apertures of the former and the through holes of the latter aligned with each other, the operation of threading and adjusting the cord in length is very easy and quick.

Furthermore, when the plug assumes the depressed position, no part of the plug sticks beyond the outer surface of the socket, so that the cord stopper as a whole is very sightly.

Still furthermore, since the plug is locked firmly in its depressed position, the cord is firmly retained in the cord stopper and will never become accidentally loose nor become detached therefrom.

Furthermore, the plug is locked in a depressed position without the head projecting from the socket. The cord stopper can assume a constant shape irrespective of however thick the cord may be threaded in the cord stopper.

Still further, since it is not necessary to keep the plug and socket compressed against the biasing force which would be required by the conventional cord stopper for threading the cord through the cord stopper, the threading operation of the cord is easier.

Obviously, the skilled person would realize that various modifications and variations of the present invention are possible in light of the above teaching. It is, therefore, to be understood that within the scope of the appended claims the invention may be practiced otherwise than as specifically described, and that the invention is not limited to the embodiments described above in detail.

What is claimed is:

1. A cord stopper for fastening a cord thereto, the cord stopper comprising a socket having a pair of opposed through holes formed therethrough, a plug having a passage formed therethrough, the plug reciprocally movable within the socket between a pulled-out position where the through holes and the passage are in alignment with each other for threading of the cord therethrough and a depressed position where the cord is clamped between the edges of the through holes and the passage and means for locking the plug in the depressed position within the socket, the plug including a head and a stud mounted beneath the head, the passage being a through aperture formed through the stud; the socket having a pair of opposed through openings formed through the opposed sides thereof and disposed normal to the opposed through holes, the socket further having a pair of steps formed on its inner side and disposed above the through openings, said plug-locking means comprising a pair of resilient arms also mounted beneath the head beside the stud, the resilient arms having its distal end projecting sideways beyond the stud for locking engagement with the through openings, the distal ends of the resilient arms coming into snapping engagement with the stops when the plug assumes the pulled-out position.

2. A cord stopper for fastening a cord thereto, the cord stopper comprising a socket having a pair of opposed through holes formed therethrough, a plug having a passage formed therethrough, the plug reciprocally movable within the socket between a pulled-out position where the through holes and the passage are in alignment with each other for threading of the cord therethrough and a depressed position where the cord is clamped between the edges of the through holes and the passage and means for locking the plug in the depressed position within the socket, the plug being cylindrical, the passage being a through aperture formed diametrically through the cylindrical plug, the cylindrical plug further having a through opening formed diametrically therein, the socket comprising a hollow cylinder having a cylindrical cavity formed therein, the through holes being formed diametrically through the cylindrical socket, the socket further including a longitudinal guide groove formed in the inner peripheral sides thereof, which guide groove terminates at its lower end in a terminal through hole, said plug-locking means comprising a compression coil spring fitted in the opening and a projecting lug fastened to a distal end of the compression coil spring and adapted for guided engagement with the guide groove and locking engagement with the terminal opening when the plug assumes the depressed position; the projecting lug abutting against the upper end of the guide groove when the plug assumes the pulled-out position.

* * * * *